(12) United States Patent
Edland

(10) Patent No.: US 6,746,191 B2
(45) Date of Patent: Jun. 8, 2004

(54) REUSABLE RIVET

(75) Inventor: David W. Edland, Chippewa Falls, WI (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/777,300

(22) Filed: Feb. 6, 2001

(65) Prior Publication Data

US 2002/0106255 A1 Aug. 8, 2002

(51) Int. Cl.[7] ................................................ F16B 13/04
(52) U.S. Cl. ............................. 411/34; 411/38; 411/45
(58) Field of Search ........................ 411/34–38, 45, 411/55, 999, 340, 344, 345, 29

(56) References Cited

U.S. PATENT DOCUMENTS

| | | | |
|---|---|---|---|
| 2,913,953 A | * | 11/1959 | Tendler |
| 3,136,203 A | * | 6/1964 | Davis |
| 3,316,796 A | * | 5/1967 | Young |
| 3,453,927 A | * | 7/1969 | Moore |
| 3,487,746 A | * | 1/1970 | Kapnek |
| 3,505,921 A | * | 4/1970 | Wigam |
| 3,659,449 A | * | 5/1972 | Abernathy |
| 3,750,518 A | * | 8/1973 | Rayburn |
| 3,858,479 A | * | 1/1975 | Sekhon |
| 3,888,156 A | | 6/1975 | Fima |
| 4,152,968 A | | 5/1979 | Lassine |
| 4,197,781 A | | 4/1980 | Giannuzzi |
| 4,212,224 A | | 7/1980 | Bragg, Jr. et al. |
| 4,238,446 A | * | 12/1980 | Tanaka |
| 4,274,324 A | | 6/1981 | Giannizzi |
| 4,556,351 A | | 12/1985 | Wollar et al. |
| 4,617,692 A | * | 10/1986 | Bond |
| 4,642,009 A | | 2/1987 | Fischer |
| 4,659,269 A | | 4/1987 | Stromiedel |
| 4,701,993 A | | 10/1987 | Bradley et al. |
| 4,712,956 A | | 12/1987 | Bond et al. |
| 4,762,450 A | | 8/1988 | Schwind et al. |
| 4,776,737 A | | 10/1988 | Wollar |
| 4,875,815 A | | 10/1989 | Phillips, II |
| 4,878,790 A | | 11/1989 | McSherry et al. |
| 5,044,849 A | | 9/1991 | Starke |
| D325,869 S | | 5/1992 | Rubenstein et al. |
| 5,178,501 A | | 1/1993 | Carstairs |
| 5,195,856 A | | 3/1993 | McSherry et al. |
| 5,246,323 A | | 9/1993 | Vernet et al. |
| 5,380,135 A | | 1/1995 | Anquetin |
| 5,509,765 A | * | 4/1996 | Albin |
| 5,690,454 A | | 11/1997 | Smith |

FOREIGN PATENT DOCUMENTS

DE 3800067 1/1988

* cited by examiner

*Primary Examiner*—Flemming Saether
(74) *Attorney, Agent, or Firm*—Pitney, Hardin, Kipp & Szuch LLP

(57) ABSTRACT

The rivet includes a screw element which rotates within a body element. The body element includes an upper collar, integral with the body head, which is longitudinally stabilized with respect to the rotating screw element. The body element further includes a lower collar which is internally threaded and engages the external threads of the shank of the screw element. The lower collar therefore traverses a portion of the shank of the screw element as the screw element rotates. Folding legs join the upper collar and the lower collar. In the uninstalled position, the folding legs are parallel to and abut the screw shank. However, in the installed position, the lower collar approaches the upper collar and the legs fold so as to be substantially perpendicular to the screw shank.

18 Claims, 2 Drawing Sheets

REUSABLE RIVET

BACKGROUND OF THE INVENTION

1. Field of the Invention

This invention pertains to a reusable rivet, which is formed by a two-shot molding process, wherein a central rotatable screw element drives a lower threaded collar of a body element so that folding legs extend into an engaged position.

2. Description of the Prior Art

In the prior art, rivets of various kinds are known. However, the installed position of many rivets includes the inelastic deformation of metal, so that removal of the rivet typically destroys the rivet so that subsequent use is not possible. Similarly, some rivets may include locking engagement which is not meant to be reversible so that the removal of the rivet requires that the rivet be torn or ripped in a way such that subsequent re-use is not possible.

Additionally, many rivets include two pieces which are manufactured and even shipped separately and assembled immediately prior to installation. Such a design increases the manufacturing, shipping and assembly costs.

Examples of prior art rivets may be found in U.S. Pat. No. 5,690,454 entitled "Anchoring Retainer for Threaded Fasteners", issued on Nov. 25, 1997 to Smith; U.S. Pat. No. 4,776,737 entitled "Re-Usable Two-Piece Blind Fastener", issued on Oct. 11, 1988 to Wollar; U.S. Pat. No. 4,659,269 entitled "Fastening Dowel of Plastics", issued on Apr. 21, 1987 to Stromiedel; and U.S. Pat. No. 4,274,324 entitled "Hollow Wall Screw Anchor", issued on Jun. 23, 1981 to Giannuzzi.

OBJECTS AND SUMMARY OF THE INVENTION

It is therefore an object of the present invention to provide a rivet which is reusable.

It is therefore a further object of the present invention to provide a rivet which minimizes inelastic deformations during installation.

It is therefore a still further object of the present invention to provide a rivet which can be removed from the installed position without damaging the rivet, and which can be re-used.

It is therefore a still further object of the present invention to provide a rivet which can be manufactured and shipped as a single unit.

It is therefore a still further object of the present invention to provide a rivet which can be installed and removed with standard tools, in an ergonomically intuitive manner.

These and other objects are attained by providing a rivet with a body element with a head and a lower internally threaded collar. which are joined by foldable legs. A screw element includes a screwhead and is rotatable but longitudinally stabilized within the head of the body. The screw element further includes a threaded shank with an enlarged lower end. The lower internally threaded collar is threadably engaged with the threaded shank and moves longitudinally bounded by the head of the body and the enlarged lower end of the threaded shank. When the lower internally threaded collar is against the enlarged lower end of the threaded shank, the legs of the body abut and are parallel to the threaded shank. This is the uninstalled position. However, as the internally threaded collar is driven toward the head of the body, the legs fold so as to be perpendicular to the threaded shank and thereby form the installed position.

The rivet is formed by a two-shot molding process, wherein the screw element is first molded from a glass filled nylon 6/6 or similar material, and then the body element is molded around the screw element from nylon 6/6 or similar material.

BRIEF DESCRIPTION OF THE DRAWINGS

Further objects and advantages will become apparent from the following description and claims, and from the accompanying drawings, wherein:

DETAILED DESCRIPTION OF THE PREFERRED EMBODIMENT

Figure 1:
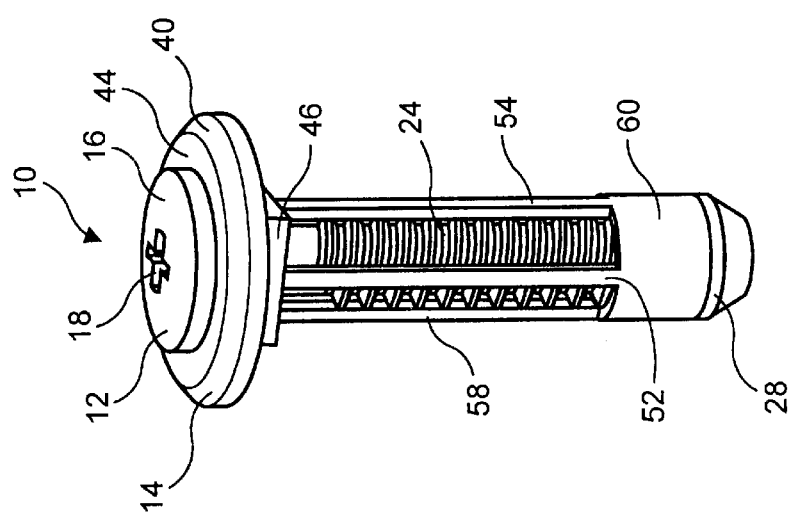
FIG. 1 is a perspective view of the reusable rivet of the present invention, shown in the uninstalled position.

Referring now to the drawings in detail wherein like numerals indicate like elements throughout the several views, one sees from FIG. 1 that rivet 10 of the present invention includes screw element 12 and body element 14.

Screw element 12 rotates about longitudinal axis 100 and includes screwhead 16 which includes Phillips-head or similar grooves 18. Unthreaded shank portion 20 extends from screwhead 16 and includes disk-shaped locking ring 22 which, as will be explained hereinafter, stabilizes the screw element 12 longitudinally with respect to the head of the body element 14.

Figure 3:
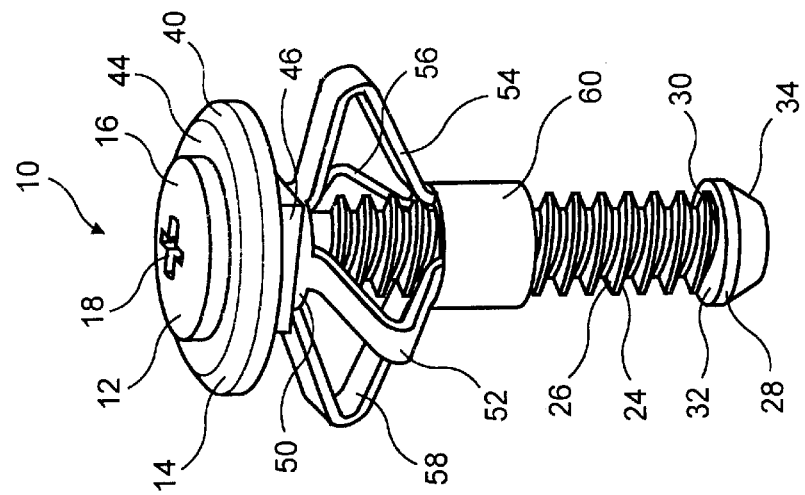
FIG. 3 is a perspective view of the reusable rivet of the present invention, shown with the internally threaded collar moving toward the installed position.
Figure 4:
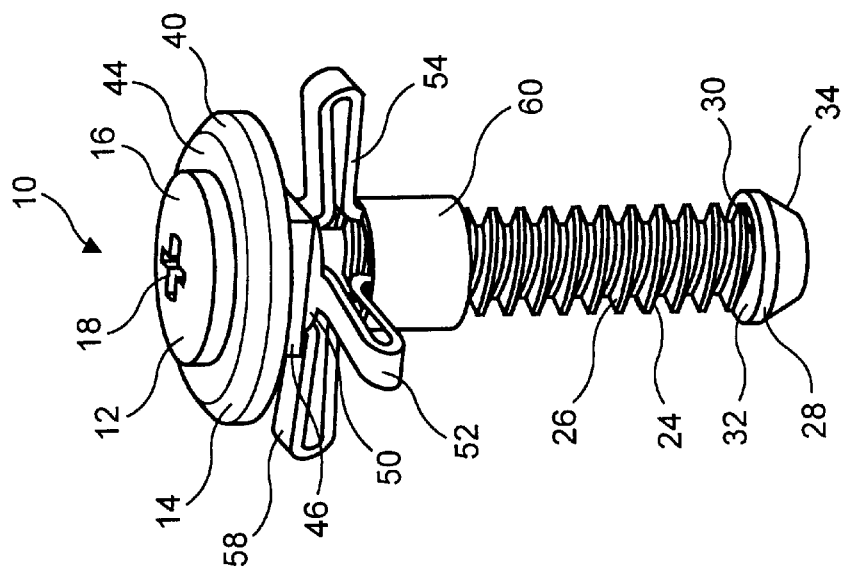
FIG. 4 is a perspective view of the reusable rivet of the present invention in the installed position with the internally threaded collar in the uppermost position, with the legs folded perpendicularly to the shank of the screw element.

Threaded shank portion 24 extends from unthreaded shank portion 20. As can be seen in FIGS. 3 and 4, the threads 26 of threaded shank portion 24 may be segmented in intermediate longitudinal areas. Lower head 28, in the shape of an inverted truncated cone, is formed at the distal end 30 of threaded shank portion 24. Base 32 of lower head 28 forms a stop at the distal end 30 of threaded shank portion 24. Likewise, inclined walls 34 of base 32 form a chamfered toroidal surface for guiding rivet 10 into an aperture of a panel or other structure.

Figure 5:
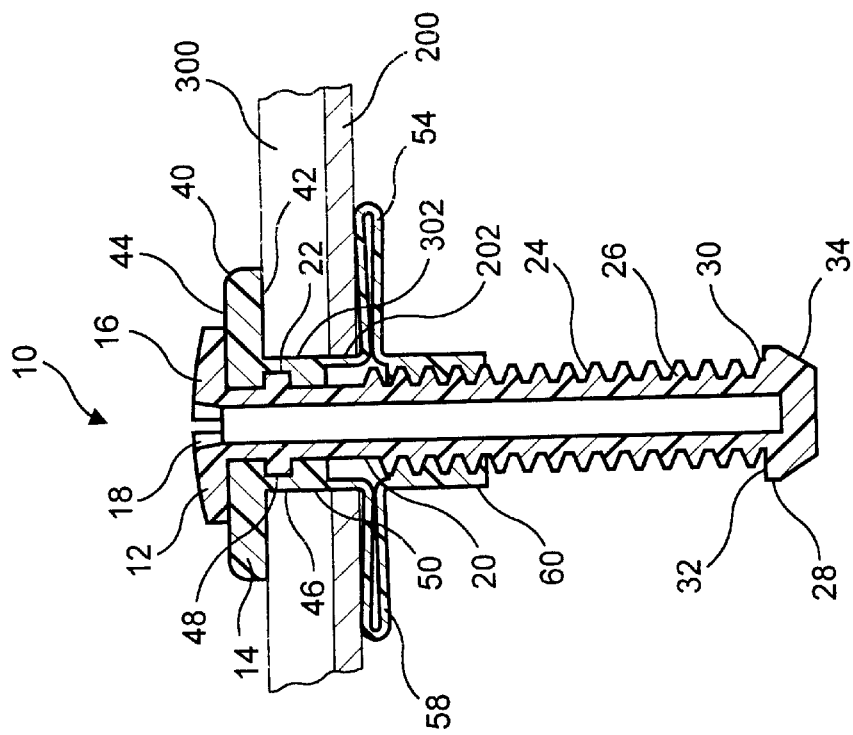
FIG. 5 is a cross-sectional view of the reusable rivet of the present invention, shown in the installed position with respect to the primary and secondary panels.

Body element 14 includes disk-shaped head 40 with a lower surface 42 which serves as a stop against secondary panel 300 (see FIG. 5). Likewise, body disk-shaped head 40 has an upper surface 44 against which head 16 of screw element 12 abuts. Central aperture 46 passes through disk-shaped head 40 with unthreaded shank portion 20 of screw element 12 inserted therethrough. Upper square collar 44 is formed integrally with disk-shaped head 40. As central aperture 46 passes through upper square collar 44, internal circular groove 48 is formed to rotationally engage disk-shaped locking ring 22 of unthreaded shank portion 20 of screw element 12. This allows rotation of screw element 12 within body element 14, while longitudinally stabilizing screw element 12 with respect to upper square collar 44. The square shape of upper square collar 44 (other shapes can be chosen) is to engage the complementary square-shaped aperture 302 of primary panel 300 as shown in FIG. 5.

Figure 2:
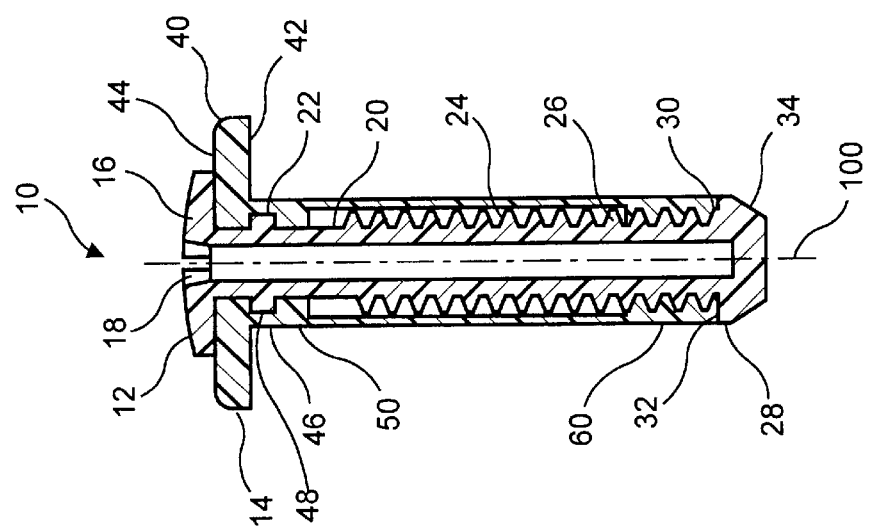
FIG. 2 is a cross-sectional view of the reusable rivet of the present invention, shown in the uninstalled position.

Round portion 50 is formed below upper square collar 44 with four folding legs 52, 54, 56, 58 extending therefrom. Four folding legs 52, 54, 56, 58, in the initial as-molded and uninstalled position as shown in FIGS. 1 and 2, extend parallel and outwardly adjacent from threaded shank portion 24 to lower internally threaded collar 60. Lower internally threaded collar 60 is formed integrally with folding legs 52, 54, 56, 58 and extends circumferentially about threaded shank portion 24. The revolution or screwing movement of screw element 12 with respect to body element 14 causes lower threaded collar 60 to travel longitudinally along threaded shank portion 24. In the initial as-molded and uninstalled position shown in FIGS. 1 and 2, lower internally threaded collar 60 abuts lower head 28, the travel of lower internally threaded collar 60 being stopped thereby.

Rivet 10 is typically molded by a two-shot process. The screw element 12 is molded in the first shot using a glass filled nylon 6/6 or similar material. The mold (not shown) opens, and the platen rotates 180 degrees. The mold closes on the screw element 12 and a second resin, such as nylon 6/6 or similar material, is injected into the mold cavity to form the body. The mold opens and a finished unitary rivet 10 is ejected. The rivet 10 is then ready to be shipped as a single piece to the customer.

To install rivet 10, the end customer typically inserts rivet 10 through a square aperture 302 in the secondary panel 300 and into the aperture 202 in the primary panel. Upper square collar 44 is engaged by square aperture 302 and lower surface 42 of head 40 of body element 14 is flush against secondary panel 300. An air gun or similar tool is used to engage grooves 18 of screw element 12 and rotate screw element 12, typically in a standard clockwise direction. As screw element 12 is turned, lower internally threaded collar 60 moves longitudinally upwardly toward head 40 of body element 14. As shown in FIGS. 3, 4 and 5, legs 52, 54, 56, 58 buckle outwardly as collar 60 moves upwardly, until legs 52, 54, 56, 58 are substantially perpendicular to screw element 12. When the fully installed position of FIGS. 4 and 5 is reached, the torque will increase causing the air gun to stop.

In order to subsequently remove rivet 10, screw element 12 is rotated in the opposite, typically counter-clockwise, direction. Screw element 12 will not back out of body element 14 due to locking ring 22 being engaged by circular groove 48. Therefore, lower internally threaded collar 60 will move down threaded shank portion 24 from the position shown in FIGS. 4 and 5 toward to the position shown in FIGS. 1 and 2. The torque will increase when lower internally threaded collar 60 abuts lower head 28, causing the air gun to stop. It is envisioned that little or no inelastic deformation will have occurred to rivet 10 during installation and subsequent removal, so that rivet 10 can be installed repeatedly.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. A rivet comprising:
   a screw element including a screwhead and a shank, said shank including a threaded portion, said screw element rotating about a longitudinal axis;
   a body element, including an aperture through which said screw element extends, said body element further including a head and a lower collar, wherein said head and said lower collar are attached by a plurality of folding legs;
   said screwhead abutting a top of said head in both an installed and an uninstalled position; and
   said head being longitudinally stabilized with respect to said screw element during rotation of said screw element and said lower collar longitudinally traversing a portion of said screw element during rotation of said screw element;
   wherein said shank terminates in an integral enlarged portion which has a diameter substantially equal to that of said lower collar and is substantially free of longitudinal movement during rotation of said screw elements; and a means for longitudinally stabilizing said screw element with respect to said body element during rotation of said screw.

2. The rivet of claim 1, wherein said means for longitudinally stabilizing comprises a rotational disk on said screw element and a circular groove on said body element and, wherein said rotational disk is engaged within said circular groove.

3. The rivet of claim 2 wherein said body element further includes an upper collar integral with said head.

4. The rivet of claim 3 wherein said screwhead includes grooves for engagement by an installing tool.

5. The rivet of claim 4 wherein said lower collar includes internal threads which threadably engage said threaded portion of said shank.

6. The rivet of claim 5 wherein the rivet has an uninstalled position and an installed position, wherein said legs extend parallel to and abut said shank in said uninstalled position, and wherein said legs fold and extend substantially perpendicular from said shank in said installed position.

7. The rivet of claim 6 wherein said integral enlarged portion limits travel of said lower collar along said shank.

8. The rivet of claim 7 wherein said lower collar abuts said enlarged portion in said uninstalled position and wherein said lower collar is proximate to said upper collar in said installed position.

9. The rivet of claim 8 wherein said screw element is formed by a first shot of a two-shot molding process and said body element is formed by a second shot of the two-shot molding process.

10. The rivet of claim 9 wherein said screw element is formed of glass filled nylon 6/6 and said body element is formed of nylon 6/6.

11. A rivet comprising:
   a screw element including a screwhead and a shank, said shank including a threaded portion, said screw element rotating about a longitudinal axis;
   a body element further including a head and a lower collar, wherein said head and said lower collar are attached by a plurality of folding legs;
   said screwhead abutting a top of said head in both an installed and an uninstalled position;
   said head being longitudinally stabilized with respect to said screw element during rotation of said screw element and said lower collar longitudinally traversing a portion of said screw element during rotation of said screw element;
   wherein said shank terminates in an integral enlarged portion has a diameter substantially equal to that of said lower collar and includes rotationally tapered walls, said lower collar abutting said integral enlarged portion prior to folding legs and said lower collar moving away from said integral enlarged portion during folding of said plurality of folding legs in response to rotation of said screw element; and a means for longitudinally stabilizing said screw element with respect to said body element during rotation of said screw.

12. The rivet of claim 11, wherein said means for longitudinally stabilizing comprises a rotational disk on said screw element and a circular groove on said body element and, wherein said rotational disk is engaged within said circular groove.

13. The rivet of claim 12 said body element further includes an upper collar integral with said head.

14. The rivet of claim 13 wherein said screwhead includes grooves for engagement by an installing tool.

15. The rivet of claim 14 wherein said lower collar includes internal threads which threadably engage said threaded portion of said shank.

16. The rivet of claim 15 wherein the rivet has an uninstalled position and an installed position, wherein said legs extend parallel to and abut said shank in said uninstalled position, and wherein said legs fold and extend substantially perpendicular from said shank in said installed position.

17. The rivet of claim 16 wherein said screw element is formed by a first shot of a two-shot molding process and said body element is formed by a second shot of the two-shot molding process.

18. The rivet of claim 17 wherein said screw element is formed of glass filled nylon 6/6 and said body element is formed of nylon 6/6.

* * * * *